(12) United States Patent
Berberich et al.

(10) Patent No.: US 10,734,862 B2
(45) Date of Patent: Aug. 4, 2020

(54) CONNECTING SYSTEM FOR PLUG POSITIONING

(71) Applicant: ebm-papst Mulfingen GmbH & Co. KG, Mulfingen (DE)

(72) Inventors: Joachim Berberich, Buchen (DE); Christoph Holderbach, Buchen (DE); Stefanie Wolfarth, Niederstetten (DE); Alexander Lust, Niederstetten (DE); Tobias Ehmann, Neuenstein (DE); Andreas Kaller, Öhringen (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 231 days.

(21) Appl. No.: 15/904,597

(22) Filed: Feb. 26, 2018

(65) Prior Publication Data

US 2018/0191223 A1    Jul. 5, 2018

Related U.S. Application Data

(63) Continuation of application No. PCT/EP2016/062677, filed on Jun. 3, 2016.

(30) Foreign Application Priority Data

Jun. 3, 2016 (DE) .................. 10 2015 114 192

(51) Int. Cl.
*H02K 5/22* (2006.01)
*H01R 13/52* (2006.01)
(Continued)

(52) U.S. Cl.
CPC ......... *H02K 5/225* (2013.01); *H01R 13/5219* (2013.01); *H01R 13/743* (2013.01); *H02K 5/10* (2013.01)

(58) Field of Classification Search
CPC ........ H02K 5/22; H02K 5/225; H01C 3/5219; H01C 3/743
(Continued)

(56) References Cited

U.S. PATENT DOCUMENTS 5,383,790 A * 1/1995 Kerek ............... H01R 13/6315
                                                    439/152
5,861,689 A    1/1999 Snider et al.
(Continued)

FOREIGN PATENT DOCUMENTS

DE       3721679 A1    1/1989
DE       19707850      3/1998
(Continued)

OTHER PUBLICATIONS

German Search Report for corresponding Application No. DE 102015114192.2, dated Apr. 19, 2016.

*Primary Examiner* — Quyen P Leung
*Assistant Examiner* — Eric Johnson
(74) *Attorney, Agent, or Firm* — Harness, Dickey & Pierce, P.L.C.

(57) ABSTRACT

A connecting system for a stator assembly (2) and a plug housing (3) can be inserted into an opening in a stator housing (4). A plug housing receptacle (6) is provided in the stator assembly (2). The plug housing (3) engages the housing receptacle such that it is movable relative to the stator assembly (2) in at least two perpendicular directions when mounted.

10 Claims, 2 Drawing Sheets

Figure 1:
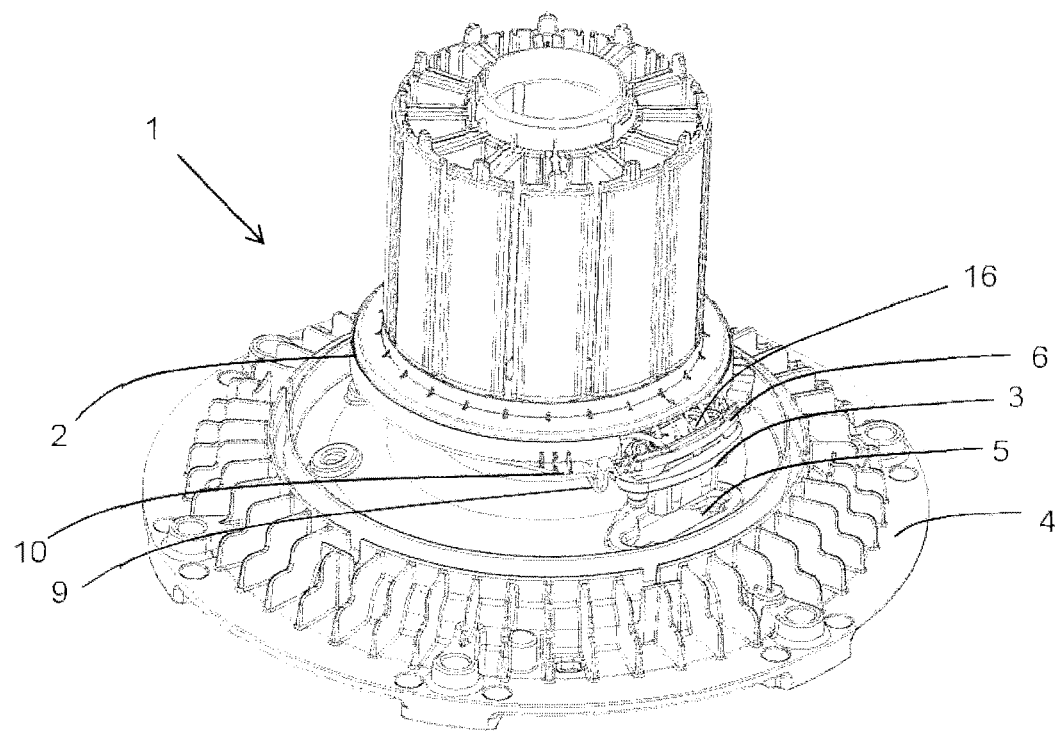

(51) Int. Cl.
*H01R 13/74* (2006.01)
*H02K 5/10* (2006.01)

(58) Field of Classification Search
USPC .......................... 310/71; 439/10, 11, 15, 700
See application file for complete search history.

(56) References Cited

U.S. PATENT DOCUMENTS

| | | | |
|---|---|---|---|
| 5,877,572 | A | 3/1999 | Michaels et al. |
| 6,089,910 | A * | 7/2000 | Suzuki ............... H01R 13/5202 439/281 |
| 2007/0079519 | A1* | 4/2007 | Hager .................. G01D 11/305 33/706 |
| 2009/0129954 | A1* | 5/2009 | Hasegawa ........... F04C 29/0085 417/410.1 |
| 2009/0269221 | A1* | 10/2009 | Hasegawa ............. F04C 23/008 417/374 |

FOREIGN PATENT DOCUMENTS

| | | |
|---|---|---|
| DE | 10334608 B3 | 3/2005 |
| DE | 102005029016 A1 | 1/2006 |
| DE | 10 2005 053 535 | 5/2007 |
| DE | 10 2011 089 081 | 6/2013 |
| EP | 1 367 695 | 12/2003 |
| EP | 2 216 552 | 8/2010 |
| EP | 2214296 A1 | 8/2010 |
| EP | 1836748 B1 | 11/2011 |
| WO | WO2014/104121 | 3/2014 |

* cited by examiner

CONNECTING SYSTEM FOR PLUG POSITIONING

CROSS-REFERENCE TO RELATED APPLICATIONS

This application is a continuation of International Application No. PCT/EP2016/062677, filed Jun. 3, 2016, which claims priority to German Application No. 102015114192.2, filed Aug. 26, 2015. The disclosures of the above applications are incorporating herein by reference.

FIELD

The disclosure relates to a connecting system between a stator assembly and a plug housing that can be inserted or pushed through an opening in a stator housing, for use in electric motors.

BACKGROUND

It is known from the state of the art to facilitate contacts in electric motors via a plug arranged in a plug housing and routed to the outside through the stator housing. The plug housing in these arrangements is fixed in a position on the respective stator assembly. Thus, a very precise alignment of the three components—stator assembly with plug housing, and electronics housing—is required when mounting the assembly. This slows down the process and increases costs. Furthermore, reductions in quality must be expected due to poorly aligned plug connections while joining the electronics unit.

SUMMARY

Therefore, it is an object of the disclosure to provide a connecting system between the stator assembly and the plug housing that is inserted into the opening in the stator housing. The connecting system facilitates the alignment of the three components by making the components moveable relative to each other, easing the mounting process and improving the mounting finish.

The disclosure proposes a connecting system of a stator assembly and a plug housing that can be inserted into an opening in the stator housing. A plug housing receptacle is provided on the stator assembly to which the plug housing is attached. The plug housing is movable relative to the stator assembly in at least two perpendicular directions when mounted. This creates a kind of floating mount or hold between the plug housing with the plug inserted into the same and the stator assembly. Thus, the three components, stator housing, plug housing and stator assembly, are movable relative to each other in at least two directions. During the mounting process, the stator assembly, with attached stator, typically is moved toward the stator housing. The plug housing is inserted or pressed through the opening in the stator housing. The position of the stator assembly is not fixed according to the disclosure, but, due to its relative movability, can be pressed against the stator housing without misaligning the components, which would create unwanted stress on the materials. The components stator housing, stator assembly and plug housing are decoupled from each other by the movable design. Thus, tolerances of the individual components can be compensated automatically.

Preferably, the stator assembly is designed to be the stator attached in a receptacle on the stator housing.

In one beneficial embodiment, one of the at least two perpendicular directions is the radial direction and/or circumferential direction. However, it is preferred that the design utilizes both directions. If the component is not round, the "radial direction" is defined as that direction, that extends from a center point outward, as it would in an imagined round form. The movability in the radial and circumferential direction facilitates the insertion of the plug housing into the stator housing. The stator assembly remains movable in two directions on a plane that is parallel to the surface of the opening.

In one embodiment of the connecting system, a fastener is arranged on the plug housing. The fastener engages with recesses in the plug housing receptacle when mounted. But the plug housing remains movable via the fastener within the recesses when mounted, both in radial and in circumferential direction. The engagement of the fastener fixes the plug housing and the plug contained in the same to the plug housing receptacle. Thus, the plug makes contact, while preventing the release of the components in an axial direction. At the same time, the fastener is designed not to engage statically and in fixed position, but to allow two degrees of freedom. This ensures the relative movement between plug housing, plug housing receptacle and stator housing in one plane in the radial and circumferential direction.

An advantageous embodiment of the fastener is to design them as double hooks with flexible hook shanks that are spaced apart in a radial direction. The hooks can be passed through recesses in the plug housing receptacle such that they engage with the edges on the other side of the recesses when mounted. To this end, the hook shanks include appropriately shaped heads that allow them to snap into place and lock. The elasticity and spacing of the hook shanks renders them movable in a radial direction relative to each other. This movement is transferred to the plug housing overall and facilitates the movement relative to the plug housing receptacle.

In one embodiment, the movability in circumferential direction also is realized via the hook shanks, in particular via the ratio of their size versus the size of the recesses in the plug housing receptacle. In this context, the design is such that the width of the hook shanks is smaller than the width of the recesses. The width extends in the circumferential direction or along a tangent to the circumferential direction. Thus, the hook shanks can be moved laterally in the recesses. Thus, a relative movement is made possible between the plug housing and the plug housing receptacle in a second direction.

In another advantageous embodiment, the connecting system includes the plug housing receptacle elastically attached to the stator assembly in at least in the axial direction by at least one spring. The axial direction is perpendicular to the relative directions of movement described above and determines the direction, where the components stator housing and stator assembly are seated against each other as well as the direction, where the plug housing is inserted into the opening on the stator housing. It is beneficial in this regard, that the spring (or springs) create(s) a preload force in the axial direction onto the plug housing receptacle and onto the plug housing attached to the same when mounted. The plug housing can thereby be pressed against the stator housing and be attached in this state.

In one advantageous embodiment, the spring or springs, is/are formed by a shank (or multiple shanks), which integrally connect(s) the plug housing receptacle and the stator assembly. Preferably, the plug housing receptacle is held by two shanks from two sides. Each of the shanks realizes a spring function due to their wave-shape. In one embodiment, the plug housing receptacle is integral to the stator assembly and, freely suspended, protrudes past adjacent sections of the stator assembly. This form also can be realized via the shanks.

Additionally, it is beneficial to arrange at least one limit stop on the plug housing. This limits the relative axial movability allowed by the spring of the plug housing receptacle relative to the stator assembly. The limit stop can be designed as a pin extending in the axial direction. It is arranged on the plug housing receptacle and extends from the same. Thus, the pin comes to a stop on the stator assembly in case of maximum axial deflection of the plug housing receptacle compared to the stator assembly.

One further developed embodiment of the connecting system provides beveled slots. The beveled slots extend in the axial direction on the outer wall of the section of the plug housing, which is designed to be passed through the opening on the stator housing. The beveled slots serve as guides for the plug housing in the opening on the stator housing. The beveled slots are designed such that a cross section of the plug housing increases in size starting from the axial end, which is inserted into the opening first, until the entire surface of the plug housing bears against the interior wall of the opening on the stator housing.

The plug housing preferably includes at least one thread. Thus, it can be bolted to the stator housing when inserted into the opening on the stator housing. Additionally, a seal can optionally be arranged between the plug housing and the stator housing.

Other advantageous embodiments of the disclosure will be explained in more detail below using the description of the preferred embodiment of the disclosure with the help of drawings. They show the following:

DRAWINGS

The drawings described herein are for illustrative purposes only of selected embodiments and not all possible implementations, and are not intended to limit the scope of the present disclosure.

Figure 2:
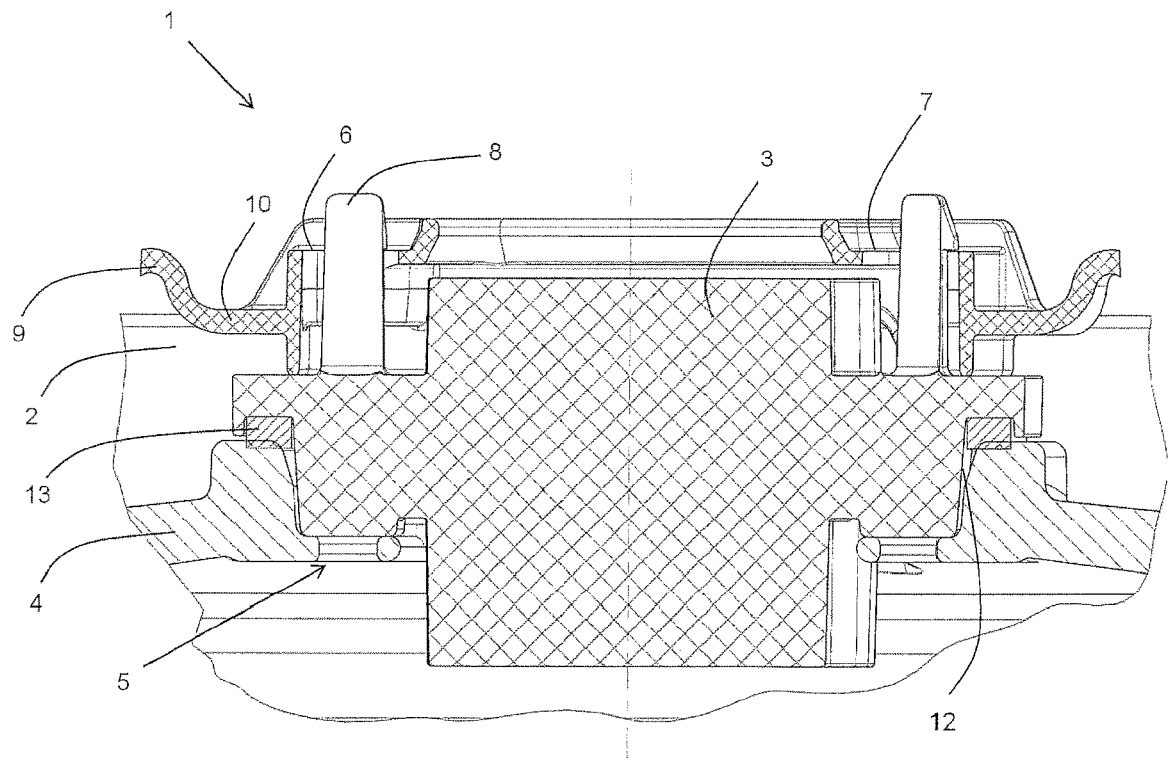
Figure 3:
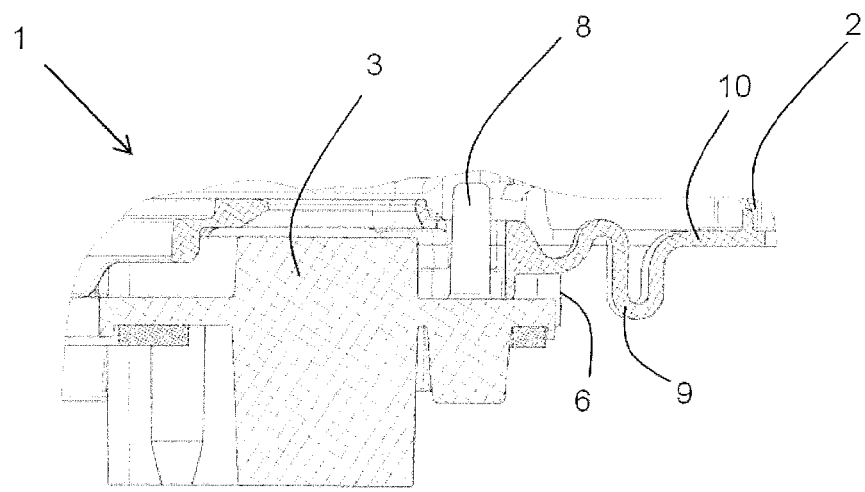
Figure 4:
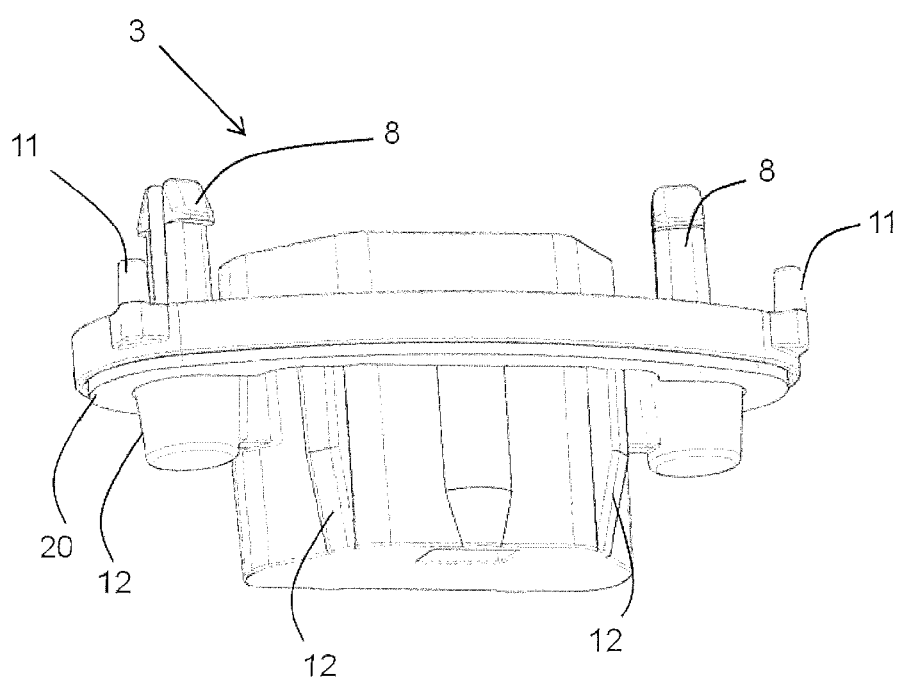

FIG. 1 is a perspective view of the connecting system.
FIG. 2 is a cross-sectional view of the connecting system of FIG. 1.
FIG. 3 is a cross-sectional view of the connecting system from FIG. 1.
FIG. 4 is a perspective view of the plug housing.

DETAILED DESCRIPTION

FIGS. 1-4 relate to a single exemplary embodiment, which means that identical references always refer to the same components.

FIG. 1 illustrates a perspective view of a connecting system of the stator assembly 2 and the plug housing 3. The plug housing 3 is inserted into the opening 5 of the stator housing 4. The plug connector 16 is housed in the plug housing 3 for contacting the electric motor. Inside the stator assembly 2, the cables of the electric motor are routed outside and into the plug connector 16.

FIG. 2 shows the connecting system from FIG. 1 in a cross-sectional view from the front. The plug housing receptacle 6 is designed to be integral to, and to radially protrude from, the stator assembly 2. It is attached by two shanks 10. To attach the plug housing 3 to the plug housing receptacle 6 in a manner that keeps the plug housing 3 movable in the radial and circumferential direction, a fastener, such as two double hooks, is designed on the plug housing 3. The double hooks include elastic hook shanks 8 that are spaced apart in the radial direction. The hook shanks 8, when mounted as shown in the drawing, reach through the recesses 7 on the plug housing receptacle 6. The hook shanks 8 engage the edges on the opposite side of the recesses. The movability of the plug housing 3 relative to the plug housing receptacle 6 in the circumferential direction is realized by making the width of the hook shanks 8 smaller than the width of the recess 7. Thus, the hook shanks 8 are able to shift in the circumferential direction. Their being designed as elastic double hooks facilitates the movability of the hook shanks 8 in the radial direction relative to each other when attached to the recesses 7. Thus, this facilitates the movement of the plug housing 3 relative to the plug housing receptacle 6 in the radial direction.

As shown in FIG. 3, the shanks 10 are designed with springs 9 made from a wave-shaped material. They serve as a protruding and freely suspended mount for the plug housing receptacle 6 on the stator assembly 2. The shanks 10 exert a preload force in the axial direction upon the plug housing receptacle 6 and the plug housing 3. The plug housing 3 is pressed against the stator housing 4. The relative axial movability of the plug housing receptacle 6 versus the stator assembly 2 is limited by a limit stop 11. The limit stop 11 extends in the axial direction.

FIG. 4 shows a perspective view of the plug housing 3. Beveled slots 12 extend in the axial direction on the outside of the plug housing section that is inserted through the opening 5 on the stator housing 4. The beveled slots 12 facilitate the insertion into the opening 5 of the stator housing 4 by reducing the cross section. The beveled slots are designed to be conical in some portions and wedge-shaped in others. A seal 13 is provided between the stator housing 4 and the plug housing 3. The seal 13 seals off the open spaces formed by the beveled slots 12. The plug housing 3 bears onto the stator housing 4 at its mounting surface 20, when mounted.

During mounting, the plug housing 3, attached to the plug housing receptacle 6, is inserted through the opening 5 on the stator housing 4. It is attached with bolts (not shown) in its plugged-in state, while being preloaded in the axial direction by the springs 9. The stator assembly 2, integral with plug housing receptacle 6, still is relatively movable by two degrees of freedom, radially and circumferentially. It can be moved to its predefined position on the stator housing 4 without causing a misalignment with the plug housing 3.

The disclosure is not limited in its embodiments to the aforementioned preferred exemplary embodiments. Rather, it includes a number of variants, that make use of the solution presented here even in substantially different embodiments. For example, various materials could be provided for the plug housing, although it preferably is made of injection-molded plastic.

What is claimed is:

1. A connecting system of a stator assembly and a plug housing that can be inserted into an opening in a stator housing comprising:
   a plug housing receptacle formed with the stator assembly, the plug housing mounted with the plug housing receptacle so that the plug housing is movably attached relative to the stator assembly in at least two directions perpendicular to each other;
   the plug housing receptacle is elastically attached to the stator assembly in at least an axial direction by at least one spring, and the at least one spring creates a preload force in the axial direction onto the plug housing receptacle and the plug housing attached to the plug housing receptacle when mounted together;

a fastener arranged on the plug housing, the fastener engages with a recess in the plug housing receptacle, wherein the fastener remains movable within the recess, when mounted with the plug housing receptacle, both in radial and in circumferential directions; and the fastener designed as double hooks with flexible hook shanks that are spaced apart in a radial direction, which can be passed through the recess and engage with the edges on the other side of the recess when mounted with the plug housing receptacle.

2. The connecting system according to claim 1, wherein one of the at least two directions is a radial direction.

3. The connecting system according to claim 1, wherein one of the at least two directions is a circumferential direction.

4. The connecting system according to claim 1, wherein a width of the hook shanks is smaller than the width of the recess.

5. The connecting system according to claim 1, wherein the at least one spring is formed with a shank that integrally connects the plug housing receptacle and the stator assembly.

6. The connecting system according to claim 1, further comprising at least one limit stop arranged on the plug housing that at least one limit stop limits the relative axial movability of the plug housing receptacle enabled by the spring relative to the stator assembly.

7. The connecting system according to claim 1, wherein the plug housing receptacle is integral with the stator assembly and the plug housing receptacle protrudes past adjacent sections of the stator assembly in the radial direction.

8. The connecting system according to claim 1, further comprising beveled slots on the plug housing, the beveled slots extending in an axial direction on an outer wall of a section of the plug housing designed to pass through the opening on the stator housing.

9. The connecting system according to claim 1, wherein the plug housing includes at least one thread, the plug housing can be bolted to the stator housing when inserted into the opening on the stator housing.

10. The connecting system according to claim 1, further comprising a seal arranged between the plug housing and the stator housing.

* * * * *

UNITED STATES PATENT AND TRADEMARK OFFICE
CERTIFICATE OF CORRECTION

| | |
|---|---|
| PATENT NO. | : 10,734,862 B2 |
| APPLICATION NO. | : 15/904597 |
| DATED | : August 4, 2020 |
| INVENTOR(S) | : Joachim Berberich et al. |

It is certified that error appears in the above-identified patent and that said Letters Patent is hereby corrected as shown below:

On the Title Page

Item (72), Inventors                  "Niederstetten" should be --Obersulm--

Item (30), Foreign Application Priority Data     "Jun. 3, 2016" should be --August 26, 2015--

Signed and Sealed this
Tenth Day of November, 2020

Andrei Iancu
*Director of the United States Patent and Trademark Office*